United States Patent [19]

Thigpen

[11] 4,321,970

[45] Mar. 30, 1982

[54] RIPPER APPARATUS

[76] Inventor: James L. Thigpen, P.O. Box 1786, Cleveland, Tex. 77327

[21] Appl. No.: 176,060

[22] Filed: Aug. 7, 1980

[51] Int. Cl.[3] .............................................. A01B 13/08

[52] U.S. Cl. .................................... 172/464; 172/483; 172/763; 172/699; 403/395; 403/361

[58] Field of Search ............... 172/763, 699, 464, 691, 172/197, 751, 484, 766, 744, 697, 773, 719, 661, 650; 403/395, 361

[56] References Cited

U.S. PATENT DOCUMENTS

| | | | |
|---|---|---|---|
| 1,308,676 | 7/1919 | Kirk | 172/744 X |
| 3,141,508 | 7/1964 | McMullen | 172/763 |
| 3,460,634 | 8/1969 | Mathers | 172/699 |
| 3,503,456 | 3/1970 | Larson | 172/484 |
| 3,807,508 | 4/1974 | Kelly | 172/699 |
| 3,901,328 | 8/1975 | Stanfield | 172/699 |

FOREIGN PATENT DOCUMENTS

| | | | |
|---|---|---|---|
| 2492 | of 1901 | United Kingdom | 172/744 |

*Primary Examiner*—Richard J. Johnson
*Attorney, Agent, or Firm*—Carl B. Fox, Jr.

[57] ABSTRACT

Ripper apparatus of the type wherein a ripper blade is releasably fixed in place through a shank pocket slot of a pivotal tool bar, wherein a replaceable wear plate forms the front side of the shank pocket to reduce wear of the shank pocket. The tool bar may be provided in several forms.

10 Claims, 7 Drawing Figures

Fig. 5
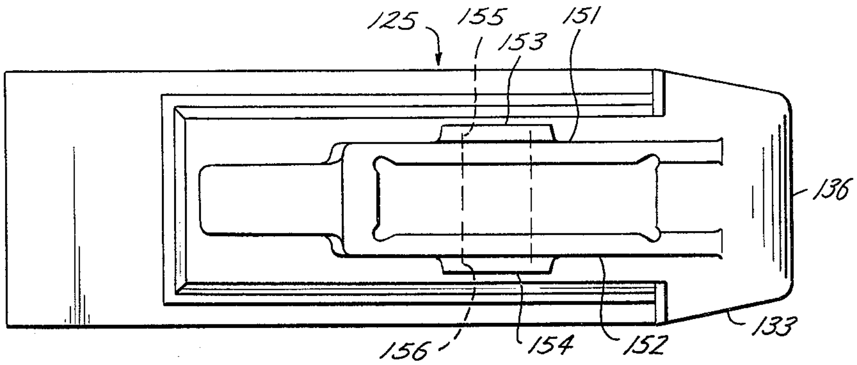
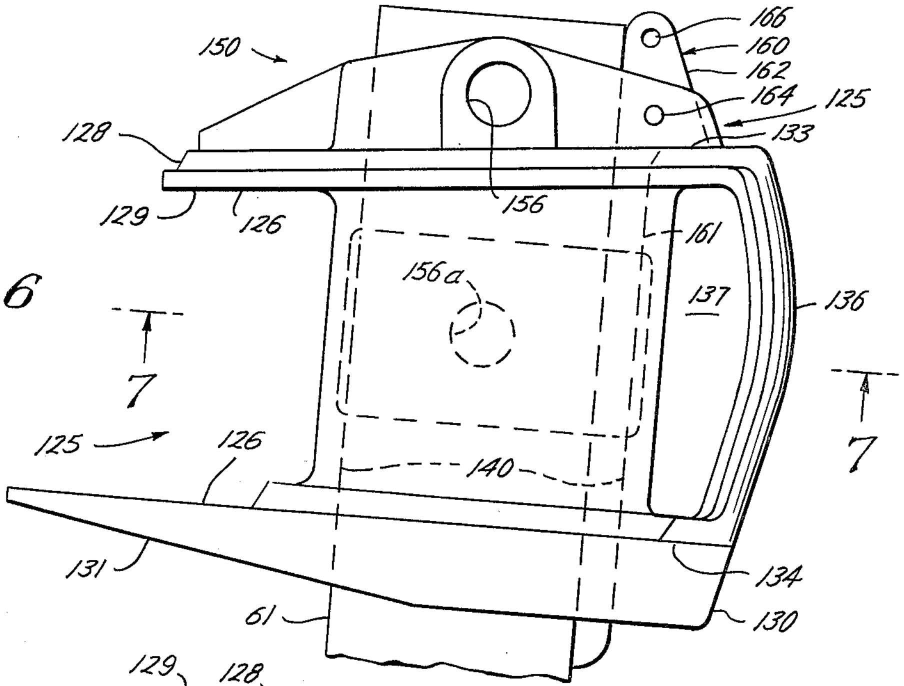
Fig. 6
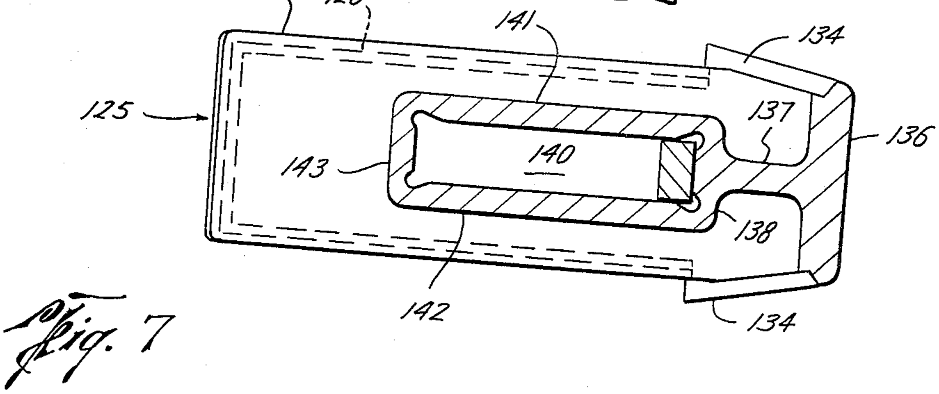
Fig. 7

RIPPER APPARATUS

BACKGROUND OF THE INVENTION

A ripper is an apparatus having a downwardly projecting blade, carried at the outer end of a pivotal arm or bar, adapted to be forceably impacted into a surface and then dragged to rip or scarify the surface. Rippers are sometimes referred to as scarifiers. Rippers may be used to break up asphalt or concrete pavement, to loosen rocky soils, to loosen rocks and stones imbedded in the earth, and for other similar purposes. The blade is supported by a forwardly extending arm or bar carried by a tractor or other suitable vehicle. The arm or bar is adapted for upward and downward pivotal movement so that the blade carried thereby may be dropped toward the earth or road surface on which ripping or scarifying work is being done.

The ripper blade is held in place at the end of the arm or bar disposed through a slot, which is called the "shank pocket". The apparatus is of heavy weight construction adapted for rugged use. For example, a ripper blade may be six feet or more in length, fifteen to twenty inches in width, and three to four inches in thickness. The blades are formed of steel, and consequently are of considerable weight. The arm or bar which supports the blade is often called the tool bar, and the auxiliary equipment for support and movement of the tool bar and blade are also of strong, heavyweight structures.

The shank of each blade is disposed through the shank pocket at the end of the tool bar, or a head carried thereby, and held in place by one or more cross pins. Since manufacturing tolerances are not close, considerable wear occurs between the blade and the tool bar or head through which the shank pocket is formed. The tendency for wear to occur has heretofore required fairly frequent replacement of the blade and of the tool bar or head, at considerable expense, and requiring considerable downtime for the replacements. This invention seeks to minimize wear between the blade and shank pocket, and to minimize the effect of such wear by minimizing equipment replacements as a result thereof.

SUMMARY OF THE INVENTION

The invention provides ripper or scarifier apparatus wherein a wear plate is provided between the ripper blade shank and the shank pocket to minimize wear caused by friction and impact therebetween. The wear plate is preferably made of hardened steel, to minimize wear thereof. By such provision, replacement of the arm or head through which the shank pocket is disposed will be minimized or eliminated. The wear plate is provided in replaceable form, so that when wear does occur, only the wear plate need be replaced and the remainder of the apparatus may be continued in use. The wear plate is disposed at the shank pocket surface where the greatest wear occurs, whereby the wear plate may be of minimal size and extent, and thereby relatively inexpensive to replace. The invention will provide extended service life for the equipment, and will minimize the cost of maintenance and repair.

A prinipcal object of the invention is to provide ripper or scarifier apparatus having a wear plate between the ripper blade shank and the shank pocket through which the ripper blade shank is disposed. Another object of the invention is to provide such wear plates which are replaceable. A further object of the invention is to provide such apparatus which is dependable and reliable in use. Yet another object of the invention is to provide such apparatus which is simple to maintain and for which the maintenance is relatively inexpensive. A still further object of the invention is to provide such apparatus which may be of diverse forms, depending on the manufacturing source.

Other objects and advantages of the invention will appear from the following detailed descriptions of preferred embodiments, reference being made to the accompanying drawings.

BRIEF DESCRIPTIONS OF THE DRAWINGS

FIG. 5 is a top elevation showing yet another form of apparatus according to the invention.

FIG. 6 is a side elevation of the apparatus shown in FIG. 5.

FIG. 7 is a cross section of the apparatus shown in FIGS. 5 and 6, taken at line 7—7 of FIG. 6.

DESCRIPTION OF THE PREFERRED EMBODIMENTS

Figure 2:
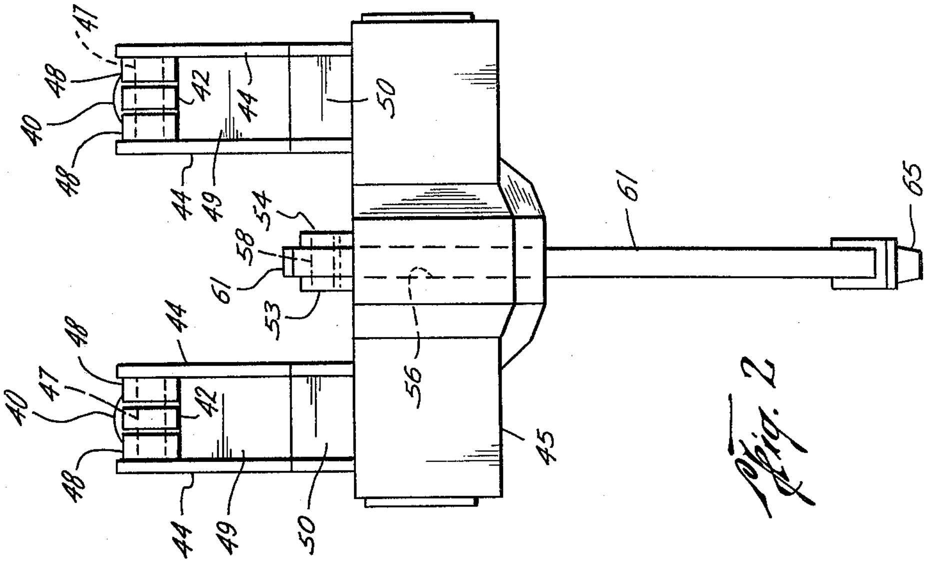
FIG. 2 is an end elevation of the apparatus shown in FIG. 1.
Figure 1:
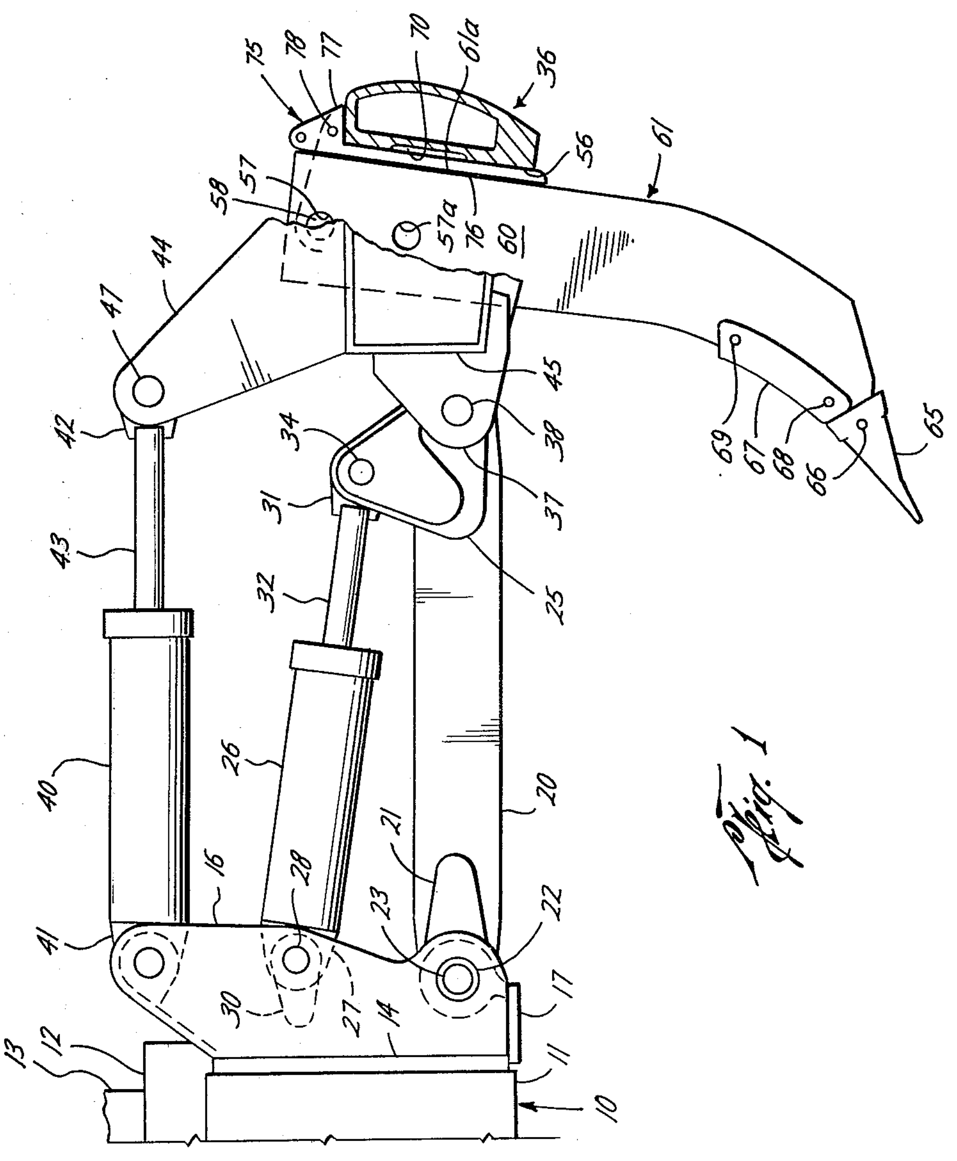
FIG. 1 is a side elevation of a ripper or scarifier apparatus of preferred form according to the invention, a portion thereof being in vertical cross section.

Referring now to the drawings in detail, and first to FIGS. 1 and 2, a tractor 10, only a fragmentary part of which is shown, includes elements 11, 12, 13, and 14. Element 14 is in the form of a flat plate at an end of the tractor. Four vertical plates 16 are provided, arranged in spaced-apart spaced pairs, all parallely disposed, only one plate 16 being shown, and each plate 16 being welded or otherwise strongly affixed to plate 14. A cross plate 17 is affixed between the lower ends of each pair of plates 16.

A pair of tool bars 20 each having a bushing plate 21 affixed to each side thereof at its lefthand end, as shown in FIG. 1, are each pivotally affixed between a pair of plates 16 by a bushing 22 and pin 23, only one tool bar 20 being shown. Connection plates 25 are welded at opposite sides of each bar 20. A pair of hydraulic cylinders 26, one being shown, each has its end plate 27 pivotally connected by a pin 28 between the two plates 16 of a pair of plates 16, bushings 30 being provided to reduce wear and decrease friction. End plate 31 of each cylinder shaft 32 is pivotally connected between one of the pairs of plates 25 by a pin 34. Each tool bar 20 is pivotally movable about one of the pins 23 by one of the hydraulic cylinders 26, so that the right hand end of each tool bar 20 may be raised and lowered.

An assembly 36 is pivotally connected to the outer ends of the two tool bars 20 by four connection flanges 37, parallely disposed, only one connection flange 37 being shown. A flange 37 is disposed at each side of each tool bar 20, each pair of flanges 37 being connected to a tool bar by a pin 38, suitable bushings (not shown) about each pin 38 being provided. The assembly 36, therefore, is pivotally movable with respect to the tool bar ends.

A pair of hydraulic cylinders 40 are provided, each having its end plate 41 connected pivotally between a pair of the plates 16, one cylinder 40 being disposed at each side of the apparatus. End plates 42 of the shafts 43 of the two cylinders 40 are each pivotally connected between a pair of plates 44 each welded or otherwise suitably affixed to body 45 of assembly 36. These connections are made by cross pins 47, suitable spacers 48 end bushings (not shown) being provided. Plates 49, 50 are welded between each pair of plates 44 to provide additional stiffness and strength.

A pair of plates 53, 54, preferably formed integrally with body 45, are parallely disposed one at each of the opposite sides of a slot 56 downwardly through body 45. Each plate 53, 54 has a circular opening 57 therethrough. A pin 58 is received through the openings 57, pin 58 also passing through a circular opening through the upper end of the shank 60 of a ripper blade 61. The slot 56 forms the shank pocket of the body 45, the shank 60 of the blade 61 being disposed therethrough. Blade 61 has an additional circular opening **57*a* therethrough by means of which the blade 61 may be moved to a higher elevation and fixed in place by the pin 58. Blade 61 has a tapered pointed end fitting 65 affixed about its lower end by a pin 66. Plate 67 of U-shaped cross section is affixed to the lefthand side of blade 61 (FIG. 1) by a pair of pins 68, 69. Tip 65 and plate 67** are formed of hardened steel suitable for penetration into and wear against hard and coarse material to which the lower blade end may be subjected.

Shank pocket 56 has a relief 70 which extends completely therearound. The sides of pocket 57 are machined above and below relief 70 to provide uniform dimensions thereof. Wear plate insert 75 in the form of a flat plate at its portion 76 and having an upwardly angular overhanding portion 77, is disposed within shank pocket 56 between edge **61*a* of blade 61 and the front side of shank pocket 56. Wear plate 75 is fixed in place by a cross pin 78 received through an opening therethrough and through matched openings through plates 53, 54**.

As mentioned earlier, hydraulic cylinders 26, one at each side, are employed for raising and lowering of the outer ends of tool bars 20. Cylinders 40, one at each side, are employed for adjusting the angle of assembly 36 and the blade 61 carried thereby. By extension of cylinder 40, the blade tip 65 may be brought to relatively close proximity to the tool bars 20. By retraction of cylinder 40, the tip 65 may be extended frontally from the position shown. Extension and retraction of the cylinders 26 causes movement of the tool bars 20 between a position somewhat lower than that shown and an elevated position at an upward inclination of up to approximately 45° to 50° from horizontal.

In operation of the apparatus to rip or scarify a surface, the tool bars 20 are elevated by operation of cylinders 26, the angular adjustment of the blade 61 being achieved by operation of cylinders 40, and the blade 61 is then forceably rammed downward into the surface to be worked, the ramming force resulting from the weight of the body 45 and the blade 61 as well as by the force imposed by extension of the cylinders 26. The tip 65 hits the surface to be worked with a hard impact, penetrating the same, after which the blade may be dragged through the surface by rearward movement of the tractor 10. These operations are repeated time and time again, with appropriate movement of the apparatus by the tractor from one place to another over the surface, until the surface has been appropriately broken and loosened. By retraction of cylinders 40, the blade tip may be moved pivotally farther frontward whereby vertical and near vertical surfaces may be worked on.

During use of conventional apparatuses not having the wear plate 75, severe wear is encountered between the front edge of the blade and the front side of the shank pocket, against which the front edge of the blade is disposed. The shank pocket is slightly larger than the blade shank, and during ripping operations the blade repeatedly slides over and impacts against the front side of the shank pocket, causing severe wear. Frequent replacements of the blade and the fitting 36 are required, at substantial cost and with downtime necessary for the replacements.

With the apparatus according to the invention, having the wear plate 75 in place, the wear on the front side of the shank pocket is greatly reduced, the wear being imposed instead on the wear plate. Therefore, wearing out of the front side of the shank pocket is materially reduced whereby the body 45 and assembly 36 are not made subject to frequent replacement. As will be understood, when the wear plate surface which is against the blade becomes worn, the wear plate may be replaced without replacement of the entire assembly 36 which has heretofore been necessary. Therefore, the apparatus is made to have an extended useful life, and maintenance to keep the apparatus in operating condition is rendered both simple and relatively inexpensive. Use of wear plates such as plate 75 has never heretofore been done, and it has been the practice to replace the entire assembly 36 after a relatively short useful life.

Figure 4:
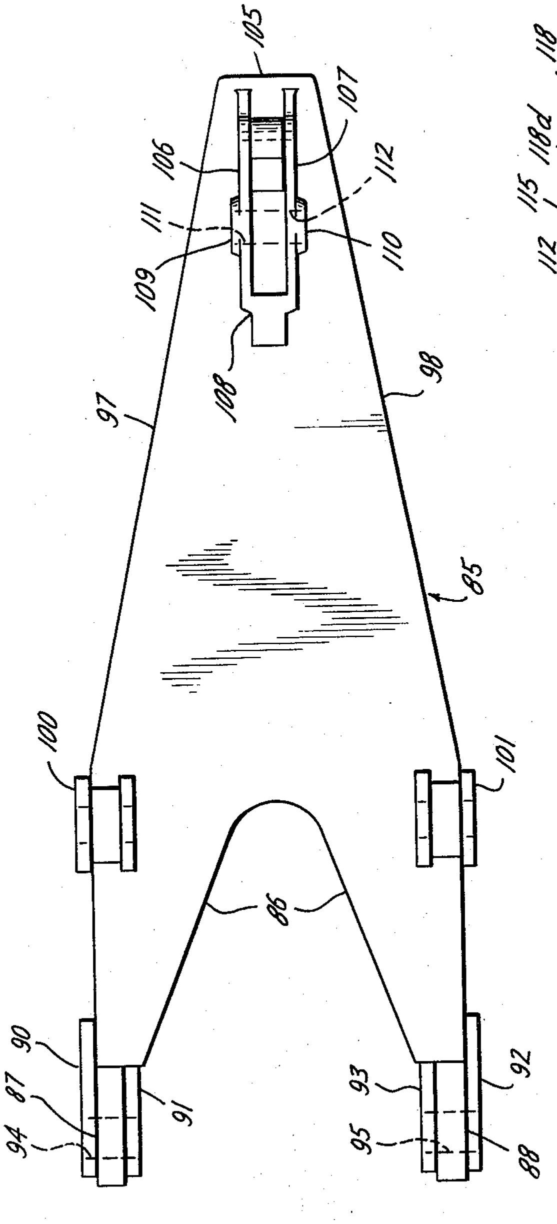
FIG. 4 is a top elevation of the apparatus shown in FIG. 3.
Figure 3:
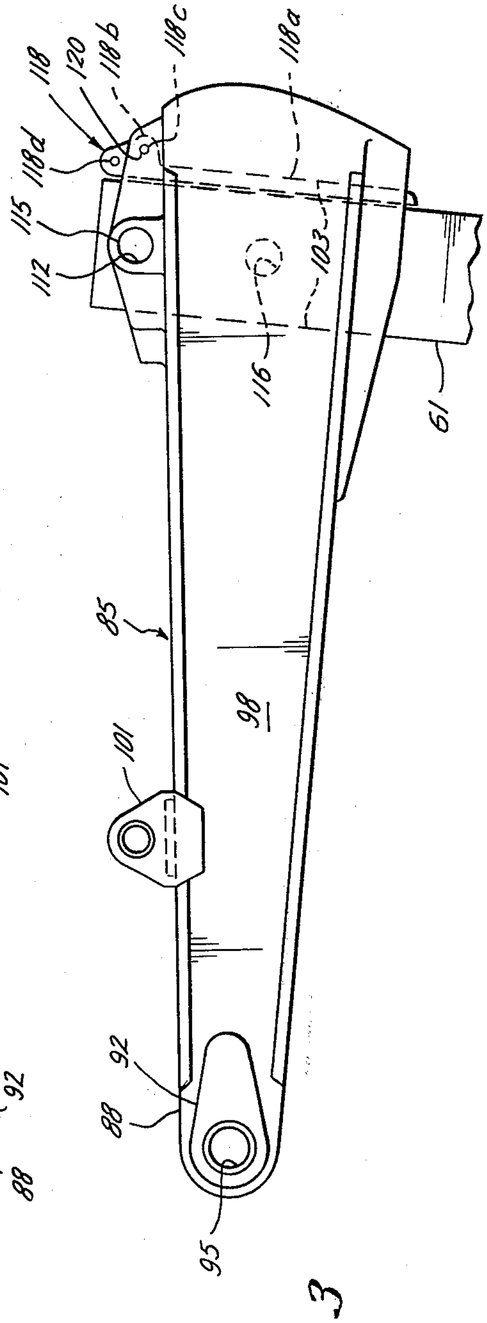
FIG. 3 is a side elevation of another form of apparatus according to the invention.

Referring now to FIGS. 3–4 of the drawings, showing a modified form of apparatus according to the invention, tool bar 85 has the form of a yoke at its lefthand end, having generally V-shaped cutout or recess 86 and opposite terminal connection plate portions 87, 88. Bushing members 90, 91 and 92, 93 are provided adjacent perforations 94, 95, respectively, through which pins may be inserted to connect connection plates 87, 88 to a suitable connection bracket or brackets carried at an end of a tractor or other movable vehicle. Tool bar 85 is tapered at its sides 97, 98. Cylinders (not shown) such as the cylinders 26 of FIG. 1, are connected between the tractor and each of the fittings 100, 101 for use in raising and lowering the tool bar 85 in pivotal movement about the pins through pin openings 94, 95.

A ripper blade 61 is disposed through a shank pocket 103 centered between angular sides 97, 98 and closely spaced from narrow end 105 of the tool bar. An upwardly projecting formation including opposite side portions 106, 107 and rearward connecting portion 108 is disposed with its inner sides aligned with the sides of the shank pocket, and has thickened portions 109, 110 through which aligned circular passages 111, 112 and through a corresponding passage through blade 61. Blade 61 may have one or more additional passages 116 therethrough whereby the blade 61 may be moved upwardly to one or more elevated positions to be connected by cross pin 115.

Wear plate 118 is in the form of a flat plate at portion **118*a*, disposed flushly against the front side of shank pocket 103, and has forwardly thickened overhanging portion 118*b* having circular perforations 118*c* and 118*d* therethrough. A cross pin 120 is passed through opening 118*c* and through registered openings through flange portions 106, 107 to hold the wear plate 118 in place. Perforation 118*d* is provided in order that the wear plate may be engaged by a hook or other tool for handling purposes. Wear plate 118** prevents undue wear between the blade 61 and the front side of shank pocket 103, as described with relation to the prior embodiment of FIGS. 1-2.

Another embodiment of apparatus 125 according to the invention is shown in FIGS. 5-7 of the drawings. The apparatus shown in FIGS. 5-7 is manufactured as a casting which is adapted to be affixed to the end of a tool bar (not shown). The end of the tool bar is fitted within the space 126, for example, by welding. The casting has an upper flange 129 which is relieved around its upper portion at 128, and has a lower flange 130 which is thinned by beveling at 131. Wing formations 133, 134 are provided which merge with curved front portion 136. Front portion 136 is convex from top to bottom and is reinforced by integral web or plate 137 which is also integral with front wall 138 of the shank pocket space 140. Walls 141, 142, 143 surround the other three sides of the shank pocket space.

Integral formation 150 includes sidewalls 151, 152 which are thickened at 153, 154, respectively, around circular openings 155, 156 respectively therethrough. Openings 155, 156 receive the pin which is received through an opening through the blade shank to hold the blade in place, as in the earlier embodiments. The wear plate element 160 has flat plate portion 161 and upper portion 162 which extends above plate or flange 129 forward of the shank pocket 140. Portion 162 extends between sidewalls 151, 152, a pin 164 received through openings through sidewalls 151, 152 and through portion 162 holding the wear plate element in place in the apparatus. An additional circular hole 166 is provided through portion 162 for handling purposes. The blade shank may have one or more additional circular holes 156*a* for positioning of the blade at raised positions.

As will be evident, when the lower end of the blade 61 of any embodiment of the apparatus is dug into the ground or other surfaces on which ripping or scarifying work is to be done, and the tractor is utilized to move the blade in a rearward direction through such material, the greatest wear between the blade and the shank pocket will be at the lower side of the forward wall of the shank pocket. With the wear plate in place, the wear at this area of the shank pocket will fall on the wear plate, and the shank pocket wall will be thereby protected and made to endure through a longer useful working life. Replacement of the wearplate is a simple matter, including removal of the cross pin which holds it in place and then removal of the wear plate, followed by replacement of the wear plate and the pin. Such maintenance operation requires little time and is much less expensive than would be the replacement of the entire tool bar or of a more or less massive fitting carried at the end of the tool bar. In the case of the FIGS. 5-7 embodiment, for example, the shank pocket may be almost sixteen inches from the rear side of the shank pocket to the forward side of the shank pocket, this dimension giving an understanding of the sizes of equipment with which the invention is concerned. The invention will result in substantial savings in money and time, and will result in far less lengthy periods of downtime for the equipment.

While preferred embodiments of the apparatus have been described and shown in the drawings, many modifications thereof may be made by a person skilled in the art without departing from the spirit of the invention, and it is intended to protect by Letters Patent all forms of the invention falling within the scope of the following claims.

I claim:

1. Ripper apparatus, comprising body means having a pivotal connection to a support means at its forward end and being pivotally movable over an angular range of movement about said pivotal connection at other portions thereof, means supported by said support means for moving said body means over said angular range of movement, said body means having a shank pocket in the form of a slot opening of substantially uniform rectilinear cross section therethrough closely spaced from its rearward other end, said shank pocket being disposed through said body means generally vertically in the general direction of said angular range of movement, the complete side of said shank pocket toward said rearward other end of said body means being formed by a removable wear plate of uniform thickness below its upper end portion and its upper end portion having means for connecting said wear plate to said body means, a ripper blade having a shank at its upper portion having a rectilinear cross section slightly smaller than said cross section of said shank pocket whereby said blade shank is slidable through said shank pocket, means for fixing the longitudinal position of said blade shank in said shank pocket whereby the lower end of said ripper blade may be used to rip and scarify surfaces and whereby said wear plate bears the load imposed by said shank against the lower rearward side of said shank pocket during said ripping and scarifying.

2. The combination of claim 1, said body means comprising a tool bar having a relatively narrow rearward other end having said shank pocket therethrough, said forward end of said tool bar having transversely spaced connection means, said means for moving said body means comprising a transversely spaced pair of cylinder means each pivotally connected to said support means at one end and each pivotally connected to said tool bar at the other end.

3. The combination of claim 1, said body means comprising a pair of spaced parallel tool bars each pivotally connected to said support means at their forward ends, and a tool body pivotally connected to the rearward other end of each said tool bar and having said shank pocket therethrough, said means for moving said body means comprising first cylinder means pivotally connected at each end between said support means and said tool bars and second cylinder means pivotally connected at each end between said support means and said tool body.

4. The combination of claim 3, each of said first and second cylinder means comprising a transversely spaced pair of cylinders.

5. The combination of claim 1, said body means comprising a tool bar means pivotally connected to said support means at said forward end and having a body fixed to its other end, said body having said shank pocket therethrough, said means for moving said body means comprising cylinder means pivotally connected at each end between said support means and said tool bar means.

6. Ripper apparatus, comprising body means having a pivotal connection to a support means at its forward end and being pivotally movable over an angular range of movement about said pivotal connection at other portions thereof, means supported by said support means for moving said body means over said angular range of movement, said body means having a shank pocket in the form of a slot opening of substantially uniform rectilinear cross section therethrough closely spaced from its rearward other end, said shank pocket being disposed through said body means generally vertically in the general direction of said angular range of movement, the side of said shank pocket toward said rearward other end of said body means being formed by a removable wear plate of uniform thickness below its upper end portion and its upper end portion having means for connecting said wear plate to said body means, a ripper blade having a shank at its upper portion having a rectilinear cross section slightly smaller than said cross section of said shank pocket whereby said blade shank is slidable through said shank pocket, means for fixing the longitudinal position of said blade shank in said shank pocket whereby the lower end of said ripper blade may be used to rip and scarify surfaces and whereby said wear plate bears the load imposed by said shank against the rearward side of shank pocket during said ripping and scarifying, said upper end portion of said wear plate being thickened to extend over said body means toward said rearward other end of said body means, said body means having flange means disposed at opposite sides of said upper end portion of said wear plate, pin means received through aligned openings through said flange means and said upper end portion of said wear plate to removably fix said wear plate in place.

7. The combination of claim 6, said means for fixing the longitudinal position of said blade shank in said shank pocket comprising pin means received through aligned openings through said flange means and said blade shank.

8. The combination of claim 7, said blade shank having plural longitudinally spaced openings therethrough whereby said blade shank may be fixed in said shank pocket by said pin means in plural longitudinally spaced positions.

9. The combination of claim 1, 2, 3, 4, 5, 6, 7, or 8, said wear plate being formed of hardened metal.

10. The combination of claim 1, 2, 3, 4, 5, 6, 7, or 8, said support means comprising a powered vehicle.

* * * * *